US005924497A

United States Patent [19]

Spooner et al.

[11] Patent Number: 5,924,497

[45] Date of Patent: Jul. 20, 1999

[54] POWER HAND TOOL WITH ROTATABLE HANDLE

[75] Inventors: Jeffrey J. Spooner, West Winfield; William Keith Wallace, Barneveld; Harley Ingersoll, Holland Patent; Yutaka Kazamaki, New Hartford, all of N.Y.

[73] Assignee: Chicago Pneumatic Tool Company, Rock Hill, S.C.

[21] Appl. No.: 08/862,949

[22] Filed: May 30, 1997

Related U.S. Application Data

[63] Continuation of application No. 08/531,623, Sep. 21, 1995, Pat. No. 5,687,802.

[51] Int. Cl.[6] ........ B23B 45/04

[52] U.S. Cl. ........ 173/169; 173/170

[58] Field of Search ........ 173/169, 170, 173/168, 217, 48

[56] References Cited

U.S. PATENT DOCUMENTS

| | | | |
|---|---|---|---|
| 1,007,295 | 10/1911 | Lane . | |
| 1,592,130 | 7/1926 | Wadsworth . | |
| 2,430,422 | 11/1947 | Happe . | |
| 2,542,014 | 2/1951 | Lewis . | |
| 2,976,436 | 7/1961 | Anton . | |
| 3,077,547 | 2/1963 | Metko . | |
| 3,132,703 | 5/1964 | Larcen . | |
| 3,150,488 | 9/1964 | Haley . | |
| 3,232,151 | 2/1966 | Blachowski . | |
| 3,571,874 | 3/1971 | Van Arx . | |
| 3,847,229 | 11/1974 | Wanner et al. . | |
| 3,876,014 | 4/1975 | Moores, Jr. . | |
| 4,036,085 | 7/1977 | Sjostrand et al. . | |
| 4,210,975 | 7/1980 | Teague, Jr. et al. . | |
| 4,236,589 | 12/1980 | Griffith | 173/169 |
| 4,258,799 | 3/1981 | Eckman . | |
| 4,346,831 | 8/1982 | Haytayan . | |
| 4,476,942 | 10/1984 | Elkin . | |
| 4,522,270 | 6/1985 | Kishi . | |
| 4,643,263 | 2/1987 | Karden . | |
| 4,778,015 | 10/1988 | Jacobsson . | |
| 4,785,540 | 11/1988 | Arvidsson . | |
| 5,044,568 | 9/1991 | Shigemizu | 173/170 |
| 5,251,367 | 10/1993 | Ward et al. | 173/169 |
| 5,337,835 | 8/1994 | Bohne et al. . | |
| 5,372,420 | 12/1994 | Van Deursen et al. . | |
| 5,377,769 | 1/1995 | Hasuo et al. | 173/169 |
| 5,466,183 | 11/1995 | Kirn et al. | 173/170 |
| 5,591,070 | 1/1997 | Kachlich | 173/169 |

*Primary Examiner*—Scott A. Smith
*Attorney, Agent, or Firm*—Schmeiser, Olsen & Watts

[57] ABSTRACT

A hand held compressed air power tool is provided with a handle that can axially rotate about an orthogonal axis perpendicular to the tool housing. Thus, the handle can rotate independently of the motor housing thereby allowing the handle to point in a different direction other than toward the point of impact. The tool utilizes a rotational coupling system that allows the handle to rotate while also allowing compressed air to be fed into, and exhausted out of, the tool via the base of the handle.

9 Claims, 3 Drawing Sheets

POWER HAND TOOL WITH ROTATABLE HANDLE

This application is a continuation of application Ser. No. 08/531,623, filed Sep. 21, 1995, now U.S. Pat. No. 5,687,802.

FIELD OF THE INVENTION

The present invention relates generally to hand-held power tools. In particular, the present invention is concerned with power hand tools with adjustable handles.

BACKGROUND OF THE INVENTION

A re-occurring problem with hand-held power tools is arriving at tool handles that provide a convenient and comfortable hand/wrist position. For example, different tools may utilize a straight, side, angled or spade handle in order to achieve a correct hand/wrist position. The problem with this concept is that the operator has to do a variety of different jobs with the same tool. Thus, a straight handled tool may be ideal for one application but not ideal on another application where a turned or angle handle is better suited.

In an attempt to overcome this limitation, power tool developers and manufacturers have introduced adjustable type handles for their power tools. For example, U.S. Pat. Ser. No. 4,522,270 issued to Kishi discloses a hand-held power tool which provides a handle that pivots angularly with respect to the tool housing. Similarly, U.S. Pat. Ser. No. 3,571,874 issued to Von Arx discloses a descaling device which also has a handle that pivots angularly with respect to the tool housing. These inventions allow the tool handle to be angularly pivoted toward or away from the tool attachment/impact point. For instance, the handle may be at a 90° position with respect to the tool housing for a first job (i.e., in a "pistol" type configuration) and then changed to a 180° angle with respect to the tool housing for a second job (i.e., in a straight line configuration). This gives the operator an increased ability in finding a more comfortable or efficient handle position which he or she lacked in the past.

While the aforementioned patents provide a certain amount of improvement, there are still problems which these devices do not address. For instance, given that most tools have a trigger on the handle, these devices do nothing to change the direction of the trigger on the handle with respect to the tool housing. In other words, the trigger always faces in the same direction—towards the tool attachment/impact point. Under certain circumstances, in order to achieve the ideal hand/wrist position, an operator may want to have the trigger facing a direction other than that of the direction of the tool.

Until now, no power tool has existed which provides a handle that allows for axial rotation of the handle about an axis perpendicular to the tool housing. The present invention seeks to provide this functionality.

SUMMARY OF THE INVENTION

Briefly, the present invention provides a hand-held power tool with a handle that can freely rotate about an orthogonal axis perpendicular to the tool housing. The present invention comprises a tool housing, a handle, and a rotational coupling system connecting the tool handle to the tool housing. The coupling system comprises a system of grooves, circular rings, and gaskets which allows the handle to rotate independently of the tool housing. (Or conversely, the tool housing can rotate independently of the handle).

In addition, the present invention provides a means by which the above described hand-held tool can be powered by compressed air. The tool is constructed to receive the compressed air at the base of the handle, transport the air through the handle, through the rotational coupling system and into the tool housing where it drives a rotational motor. The air is then exhausted out of the tool housing back through the rotational coupling system and exhausted down through the handle where it exits into the atmosphere at the base of the handle. In addition, the tool handle may comprise a trigger device and a throttle valve to control the flow of air into the tool. Furthermore, the rotational coupling system may comprise a means of resistance to impede the absolute free rotation of the handle with respect to the tool housing.

In accordance with the above, it is an object of the present invention to provide a hand-held power tool that allows the handle to rotate about an orthogonal axis perpendicular to the tool housing.

In accordance with the above, it is a further object of the present invention to provide a hand-held power tool in which the trigger mechanism is allowed to be pointed in directions other than towards the front of the power tool.

BRIEF DESCRIPTION OF THE DRAWINGS

These and other advantages of the present invention become more readily apparent upon reading the following detailed description and upon reference to the drawings to which.

DETAILED DESCRIPTION OF THE PREFERRED EMBODIMENTS

Figure 1:
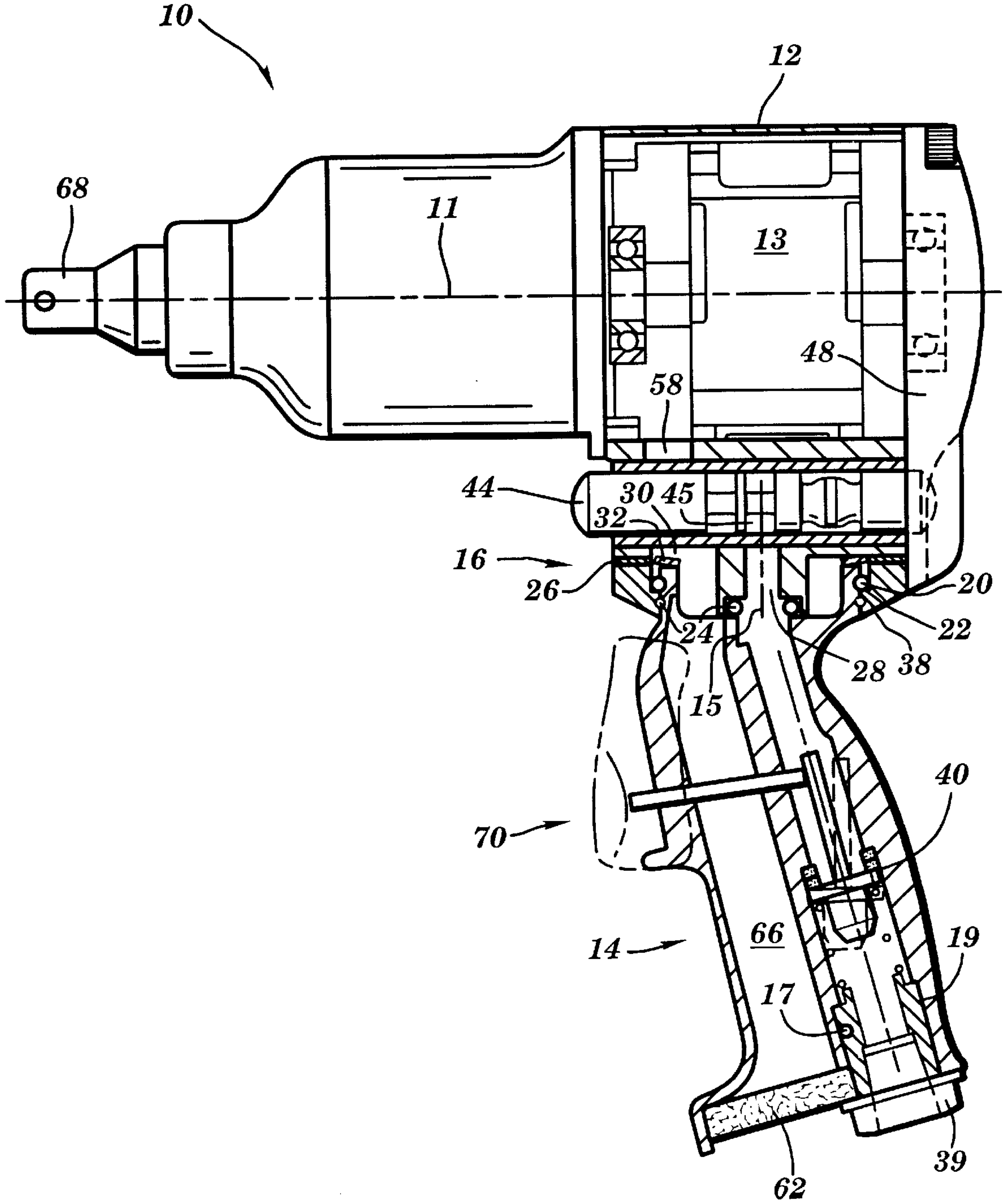
FIG. 1 is a side view of the preferred embodiment of this invention with the handle in the straight-ahead position.

Referring now to the drawings and more particularly to FIG. 1, there is shown a side view of a hand-held power tool 10 with the handle 14 in the straight-ahead position. The unit basically comprises a motor housing unit 12, a handle 14 and a rotational coupling system 16. The motor housing unit 12 extends along a longitudinal axis 11 and comprises a tool attachment area 68 at the forward end of the axis 11, and a motor 13 at the rear end of the axis 11.

The rotational coupling system 16 interconnects the motor housing 12 to the handle 14 and provides a means by which the handle 14 can rotate axially beneath the motor housing 12. Rotation occurs about an orthogonal axis 15 that is perpendicular to the motor housing's longitudinal axis 11. The coupling system comprises a circular cross section ring 20, a machined groove in the handle 22, O-rings 24, gasket 26, and seal passages 28 and 30. These components provide a relatively frictionless means by which handle 14 can rotate about the orthogonal axis 15 independent of motor housing 12.

The coupling system 16 also comprises wavey spring 32 which loads the handle outward against the ring 20 and flange 38. The load is great enough to permit the tool 10 to be positioned on the work without the handle 14 turning relative to the motor housing 12 freely, but light enough for the operator to rotate the handle 14 to the desired position. The ideal load is between 20 and 30 inch pounds, however, depending on the particular application, that range may vary.

In the preferred embodiment, the hand tool 10 is powered via compressed air. This is accomplished as follows. Air enters through inlet bushing 39, passes through the throttle valve 40, through passage 28, and to a reverse valve 44. Air inlet bushing 39 may be secured to the tool handle 14 by means of a pin 17 and a groove 19. This permits the inlet to turn freely relative to the handle 14.

With the valve in the forward position, air passes through valve port 45 to port 46 (see FIG. 2) in the motor housing 12, then through port 48 in the rear cover of the motor housing 12, causing the motor 13 to operate in the clockwise direction.

In this embodiment, there may be two means by which air can exhaust from the motor housing 12. First, there is a main exhaust which exhausts air via port 58 and through circular handle chamber 30. Exhaust air then continues through handle port 66, then through diffuser 62, and into the atmosphere.

A second type of exhaust air, referred to as residual exhaust air, passes through air feed holes on the exhaust side of the motor 13, through the motor housing port 52 (see FIG. 2), past reverse valve 44 and into a circular chamber 30 in the top of the handle 14. The residual exhaust is then exhausted into the atmosphere in the same manner as the main exhaust air (i.e., through handle port 60 and diffuser 62).

As shown in FIG. 1, the tool is depicted in its standard "straight-ahead" position. That is, the trigger 70 is pointed in the same direction as the tool attachment device 68 on the front of motor housing 12. This is the position that such tools are normally fixed for use.

The tool attachment device 68 may comprise a square drive anvil, a chuck, or any other device which will allow for the attachment of sockets, wrenches, drill bits, or any other rotating attachment apparatus.

Figure 2:
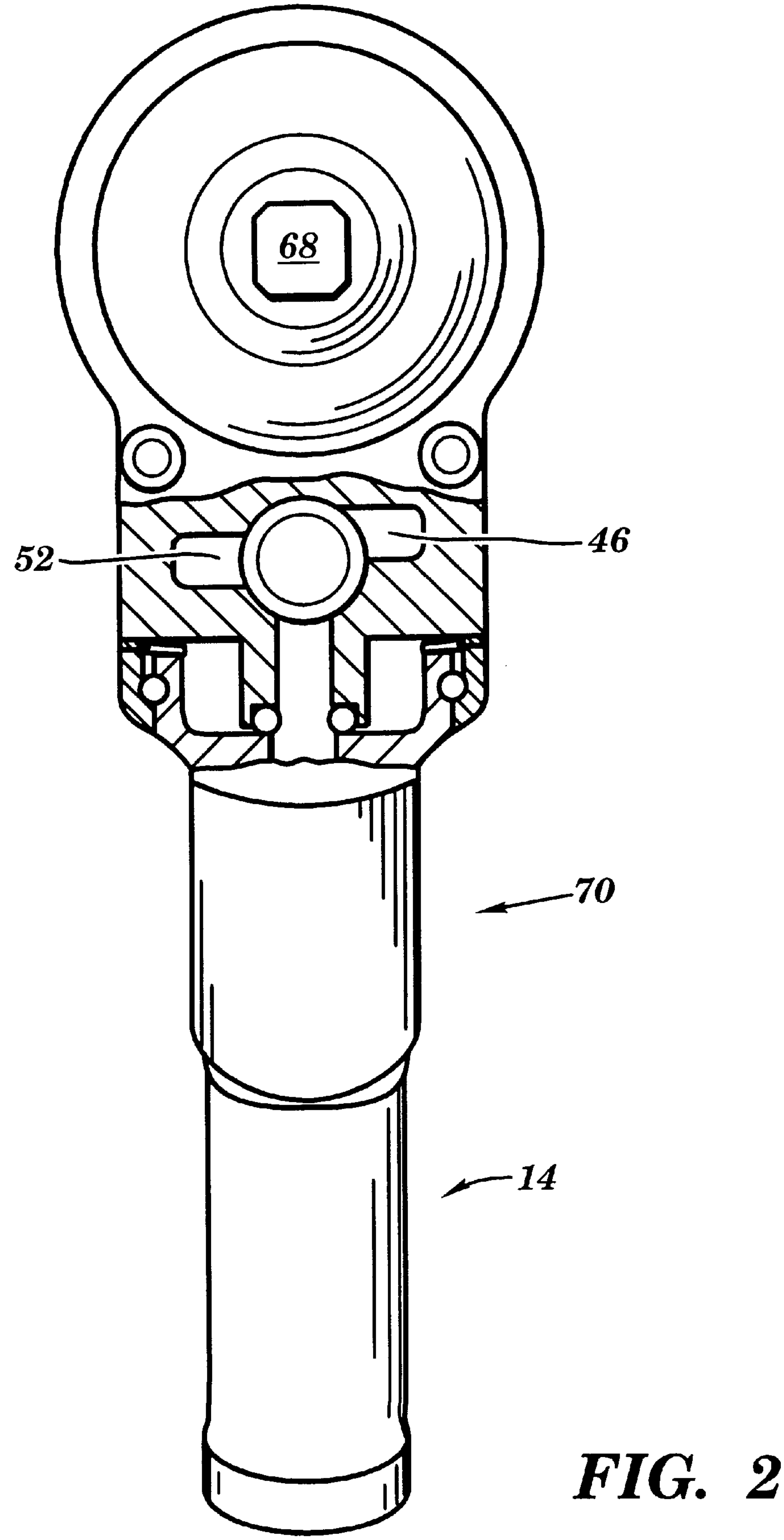
FIG. 2 is a front view of the preferred embodiment with the handle in its straight-ahead position pursuant to the present invention.

Referring now to FIG. 2, a partial cross sectional front view of the tool is shown. Handle 14 is shown with trigger 70 facing forward. Motor housing 12 is also shown with tool attachment device 68 shown facing the forward position.

Figure 3:
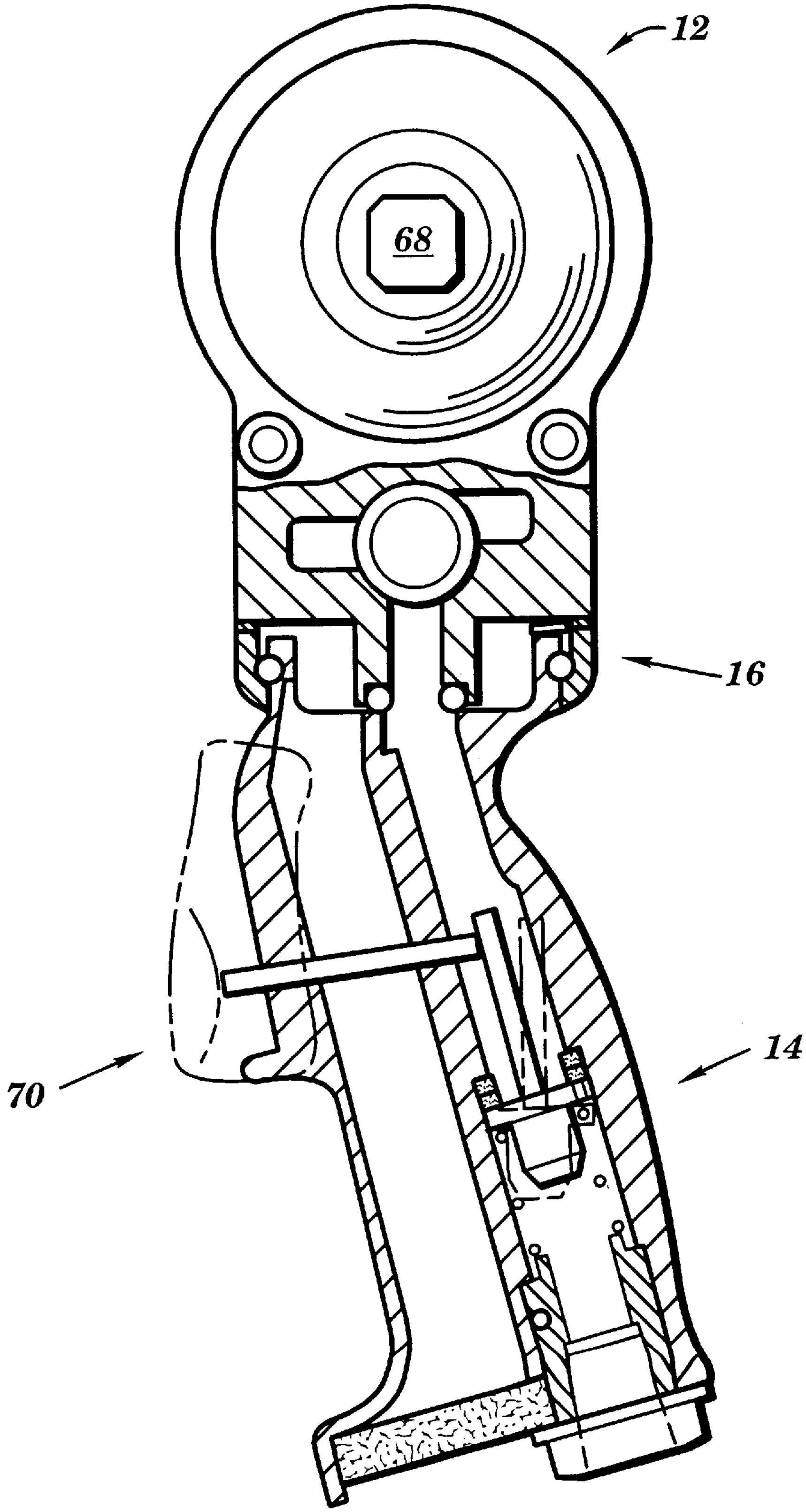
FIG. 3 is a side view of the preferred embodiment with the handle rotated 90° pursuant to the present invention.

FIG. 3 depicts the tool with the handle rotated 90°. Handle 14 is shown (along with trigger 70) facing in a leftward direction, while motor housing 12 (along with tool attachment device 68) is shown facing the forward direction. Thus, as depicted in this diagram, handle 14 and the tool housing 12 can be set to face in different directions. This allows the user to adjust the tool to obtain the correct wrist/hand position for the variety of jobs he or she may be doing.

Because of the design of the air intake and exhaust systems, along with the rotational coupling system 16, compressed air can still reach the motor housing through the handle 14 and exhaust out of the handle while the handle 14 is in any rotated position. It should also be recognized that handle 14 is fully rotatable (i.e., 360°) about the tool housing 12. This allows for an unlimited number of handle positions. It should also be recognized that the base of the handle 14 may be constructed such that it is cocked in a slightly backward position as shown in FIGS. 1 & 3.

In addition, it should also be recognized that the handle 14 rotates about an orthogonal axis 15 (see FIG. 1) that in the preferred embodiment is exactly perpendicular to the longitudinal axis 11 (see FIG. 1) of the motor housing 12. It is possible nonetheless to incorporate a system wherein the handle rotates about an axis that is not exactly perpendicular to the motor housing. In other words, the rotational coupling system which connects motor housing 12 to handle 14 could be constructed skewed, or angularly offset, to allow for a different axis of rotation.

Finally, it should also be recognized that the motor housing 12 and the handle 14 are co-planar. However, it is envisioned that a system could be utilized in which the motor housing 14 and the handle were not co-planar.

As depicted in the previous three figures, the tool motor is driven by compressed air. However, it is envisioned that this rotatable handle system could be used for any fluid-driven power tool. The rotatable handle system could also be used on tools powered by electricity.

The foregoing description of the preferred embodiments of the invention have been presented for purposes of illustration description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

We claim:

1. A hand held power tool comprising:

a motor housing;

a handle operatively attached to the motor housing and having a pressurized fluid passage extending therethrough; and means for allowing continuous, non-detaching rotation of the handle about an axis with respect to the motor housing such that said handle is rotatable through 360 degrees about said axis, wherein said means for allowing rotation consists of a non-threaded attachment between said handle and said motor housing.

2. The power tool of claim 1, wherein the tool is powered by compressed air that enters the tool through the pressurized fluid passage and exits through an outlet passage.

3. The power tool of claim 1, further including a valve positioned between the handle and motor housing.

4. The power tool of claim 3, further comprising a circular cross section ring and at least one O-ring between the handle and valve.

5. The power tool of claim 1, wherein the handle comprises a trigger device that controls flow of compressed air through the pressurized fluid passage.

6. The power tool of claim 1, wherein the means for allowing continuous, non-detaching rotation includes a wavy spring positioned so as to cause a resistance to the rotation of the handle relative to the motor housing.

7. The power tool of claim 1, wherein the pressurized fluid passage and an outlet passage exit the handle at an end of the handle via concentric sealed passages.

8. The power tool of claim 7, wherein one of the concentric sealed passages is centered in the end of the handle.

9. The power tool of claim 8, further including an O-ring to seal the pressurized fluid passage and a gasket to seal the outlet passage at a connection area to the motor housing.

* * * * *